United States Patent
Zhang et al.

(10) Patent No.: US 10,673,325 B2
(45) Date of Patent: Jun. 2, 2020

(54) DC-DC CONVERTER CONFIGURED TO SUPPORT SERIES AND PARALLEL PORT ARRANGEMENTS

(71) Applicant: Silergy Semiconductor Technology (Hangzhou) LTD, Hangzhou, ZheJiang Province (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/419,146

(22) Filed: May 22, 2019

(65) Prior Publication Data

US 2019/0372457 A1   Dec. 5, 2019

(30) Foreign Application Priority Data

Jun. 4, 2018   (CN) .......................... 2018 1 0565435

(51) Int. Cl.
*H02M 3/335* (2006.01)
*H02M 1/42* (2007.01)
*H02M 3/07* (2006.01)
*H02M 3/158* (2006.01)
*H02M 1/00* (2006.01)

(52) U.S. Cl.
CPC .............. *H02M 3/07* (2013.01); *H02M 1/42* (2013.01); *H02M 3/1588* (2013.01); *H02M 3/33584* (2013.01); *H02M 2001/007* (2013.01); *H02M 2001/009* (2013.01); *H02M 2003/072* (2013.01)

(58) Field of Classification Search
CPC ............. H02M 3/335; H02M 3/33569; H02M 3/33546; H02M 3/33576; H02M 3/337; H02M 3/33507; H02M 2001/0058; H02M 1/42; H02M 1/4208; H02M 1/08; G05F 1/44; G05F 1/10
See application file for complete search history.

(56) References Cited

U.S. PATENT DOCUMENTS

| | | |
|---|---|---|
| 5,581,454 A | 12/1996 | Collins |
| 7,696,735 B2 | 4/2010 | Oraw et al. |
| 7,907,429 B2 | 3/2011 | Ramadass et al. |
| 8,427,113 B2 | 4/2013 | King et al. |
| 8,687,382 B2 | 4/2014 | Chen |
| 8,729,819 B2 | 5/2014 | Zhou et al. |
| 8,917,528 B2 | 12/2014 | Xu |
| 9,287,782 B2 | 3/2016 | Chen |
| 9,473,034 B2 | 10/2016 | Huang et al. |
| 9,762,128 B2 | 9/2017 | Zhang et al. |
| 9,853,460 B2 | 12/2017 | Ichikawa et al. |

(Continued)

FOREIGN PATENT DOCUMENTS

TW   201543798 A   11/2015

*Primary Examiner* — Kyle J Moody
*Assistant Examiner* — Nusrat Quddus
(74) *Attorney, Agent, or Firm* — Michael C. Stephens, Jr.

(57) ABSTRACT

A DC-DC converter can include: a switched capacitor converter; and a switching converter, where input ports of the switched capacitor converter and the switching converter are coupled to each other in one of series and parallel connections, and output ports of the switched capacitor converter and the switching converter are coupled to each other in the other of series and parallel connections.

20 Claims, 8 Drawing Sheets

(56) References Cited

U.S. PATENT DOCUMENTS

| | | |
|---|---|---|
| 2009/0316443 A1 | 12/2009 | Coccia et al. |
| 2011/0273911 A1* | 11/2011 | Torrico-Bascope .................... H02M 3/33592 363/21.02 |
| 2012/0300519 A1 | 11/2012 | Clemmons et al. |
| 2013/0181620 A1 | 7/2013 | Zhao |
| 2013/0201730 A1 | 8/2013 | Luo |
| 2013/0265016 A1 | 10/2013 | Chang et al. |
| 2014/0112026 A1* | 4/2014 | Pan ................... H02M 3/33569 363/21.02 |
| 2014/0346962 A1* | 11/2014 | Sanders ............. H05B 33/0815 315/193 |
| 2017/0317601 A1* | 11/2017 | Jin ......................... H02M 3/28 |
| 2018/0198367 A1 | 7/2018 | Zhang et al. |

\* cited by examiner

DC-DC CONVERTER CONFIGURED TO SUPPORT SERIES AND PARALLEL PORT ARRANGEMENTS

RELATED APPLICATIONS

This application claims the benefit of Chinese Patent Application No. 201810565435.9, filed on Jun. 4, 2018, which is incorporated herein by reference in its entirety.

FIELD OF THE INVENTION

The present invention generally relates to the field of power electronics, and more particularly to direct current-direct current (DC-DC) converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switched capacitor converter can control the charge and discharge of capacitors through switches, in order to achieve voltage or current conversion. However, the conversion ratio of the input and output voltages of the switched capacitor converter may only be fixed. Also, due to the possibly relatively large unexpected current pulsation on the input source, the output voltage may also have pulsation. In order to change the conversion ratio of the input and output voltages, and to smooth the output voltage, a traditional switching converter may usually be coupled in series to the front stage or the back stage of a switched capacitor converter.

Figure 1:
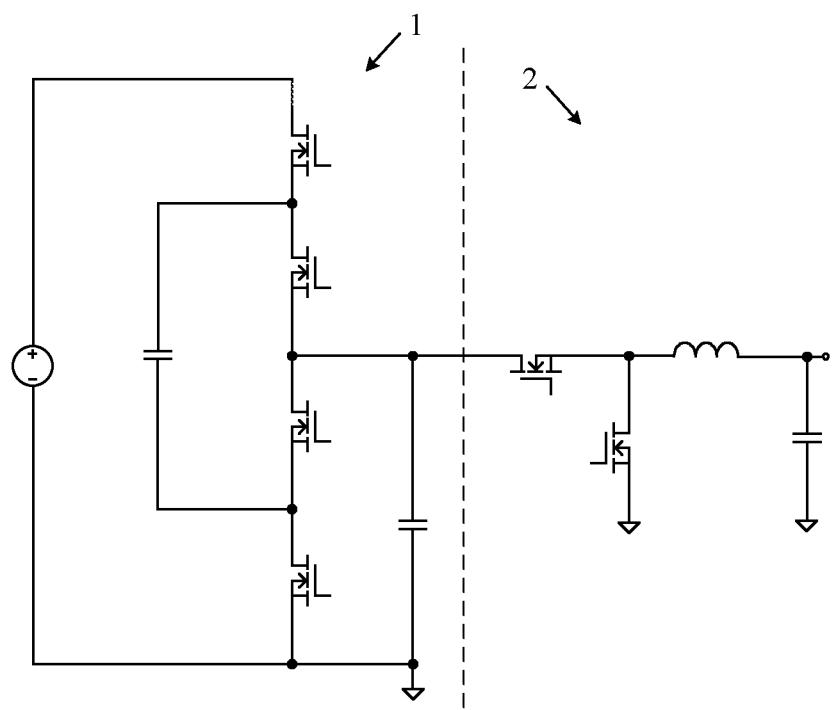
FIG. 1 is a schematic block diagram of an example DC-DC converter.

Referring now to FIG. 1, shown is a schematic block diagram of an example DC-DC converter. In this example, the input stage is switched capacitor converter 1, and the output stage is switching converter 2. However, in this arrangement, all the power can be transmitted through the switching converter, such that the efficiency of the overall system may be influenced.

In one embodiment, a DC-DC converter can include: (i) a switched capacitor converter; and (ii) a switching converter, where input ports of the switched capacitor converter and the switching converter are coupled to each other in one of series and parallel connections, and output ports of the switched capacitor converter and the switching converter are coupled to each other in the other of series and parallel connections.

Figure 2:
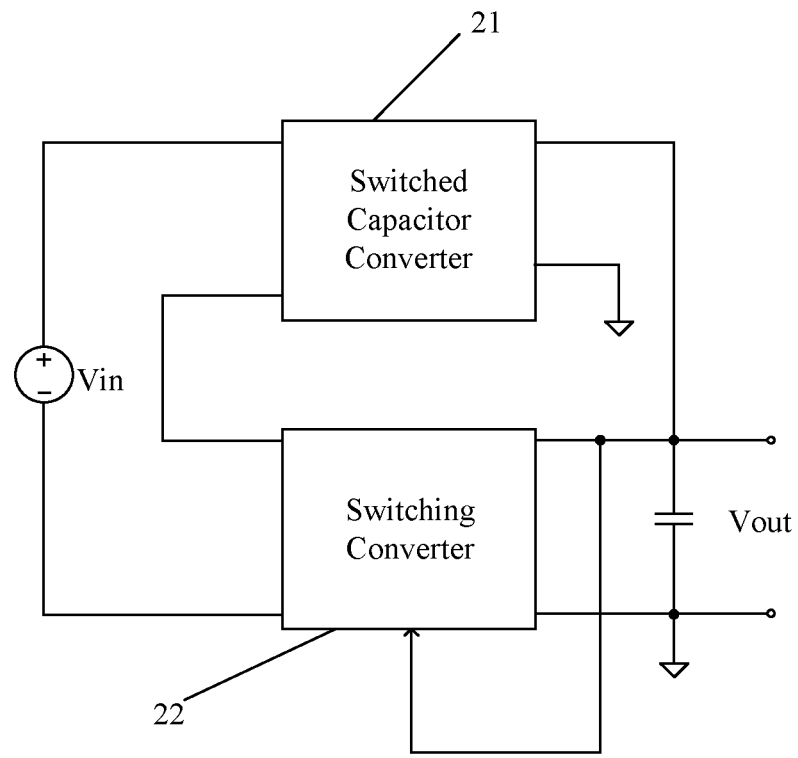
FIG. 2 is a schematic block diagram of a first example DC-DC converter, in accordance with embodiments of the present invention.

Referring now to FIG. 2, shown is a schematic block diagram of a first example DC-DC converter in accordance with embodiments of the present invention. In this example, the DC-DC converter can include switched capacitor converter 21 and switching converter 22. Input ports of switched capacitor converter 21 and switching converter 22 can connect in series, and output ports of switched capacitor converter 21 and switching converter 22 can connect in parallel. Switched capacitor converter 21 may be isolated or non-isolated. When switched capacitor converter 21 operates in an open-loop control mode, the relationship between input voltage Vin1 and output voltage Vout1 of switched capacitor converter 21 can be as follows:

$$\frac{Vout1}{Vin1} = X$$

Here, X is a constant value, and ratio X of the output voltage and the input voltage can be adjusted to meet circuit requirements.

Switching converter 22 can operate in a closed-loop control mode, such that duty cycle D of switching converter 22 may be adjusted in accordance with an expected output voltage. The relationship between input voltage Vin2 and output voltage Vout2 of switching converter 22 can be as follows:

$$\frac{Vout2}{Vin2} = M(D)$$

Here, M(D) is a function about duty cycle D of switching converter 22.

In this particular example, since the input ports of switched capacitor converter 21 and switching converter 22 are coupled in series, and the output ports of switched capacitor converter 21 and switching converter 22 are coupled in parallel, input voltage Vin and output voltage Vout of the DC-DC converter can be expressed as:

$$Vin = Vin1 + Vin2 = \frac{Vout1}{X} + \frac{Vout2}{M(D)}$$

Since the output ports of switched capacitor converter 21 and switching converter 22 are coupled in parallel, Vout1=Vout2=Vout. Therefore, the relationship between input voltage Vin and output voltage Vout of the DC-DC converter can be further expressed as:

$$\frac{Vout}{Vin} = \frac{1}{\frac{1}{X} + \frac{1}{M(D)}}$$

In this example, switched capacitor converter 21 and switching converter 22 can perform bidirectional power conversion, such that the DC-DC converter may achieve bidirectional regulation. It should be understood that switching converter 22 can be a converter with any suitable topology (e.g., boost, buck, buck-boost, Zeta, Sepic, Cuk, flyback, forward, push-pull, half-bridge, full-bridge, LLC, etc.).

From the above, the input ports of the switched capacitor converter and the switching converter are coupled in series, and output ports of the switched capacitor converter and the switching converter are coupled in parallel, such that the switched capacitor converter and the switching converter both can transmit the power to the output port of the DC-DC converter, thereby reducing the power transmitted by the switching converter. Since the efficiency of the switched capacitor converter is higher than the efficiency of the switching converter, the efficiency of the overall system can be improved. Also, the output voltage of the DC-DC converter can be regulated by adjusting the duty cycles of switching converter 22, thereby achieving a relatively smooth adjustment for the output voltage and an adjustable gain.

Figure 3:
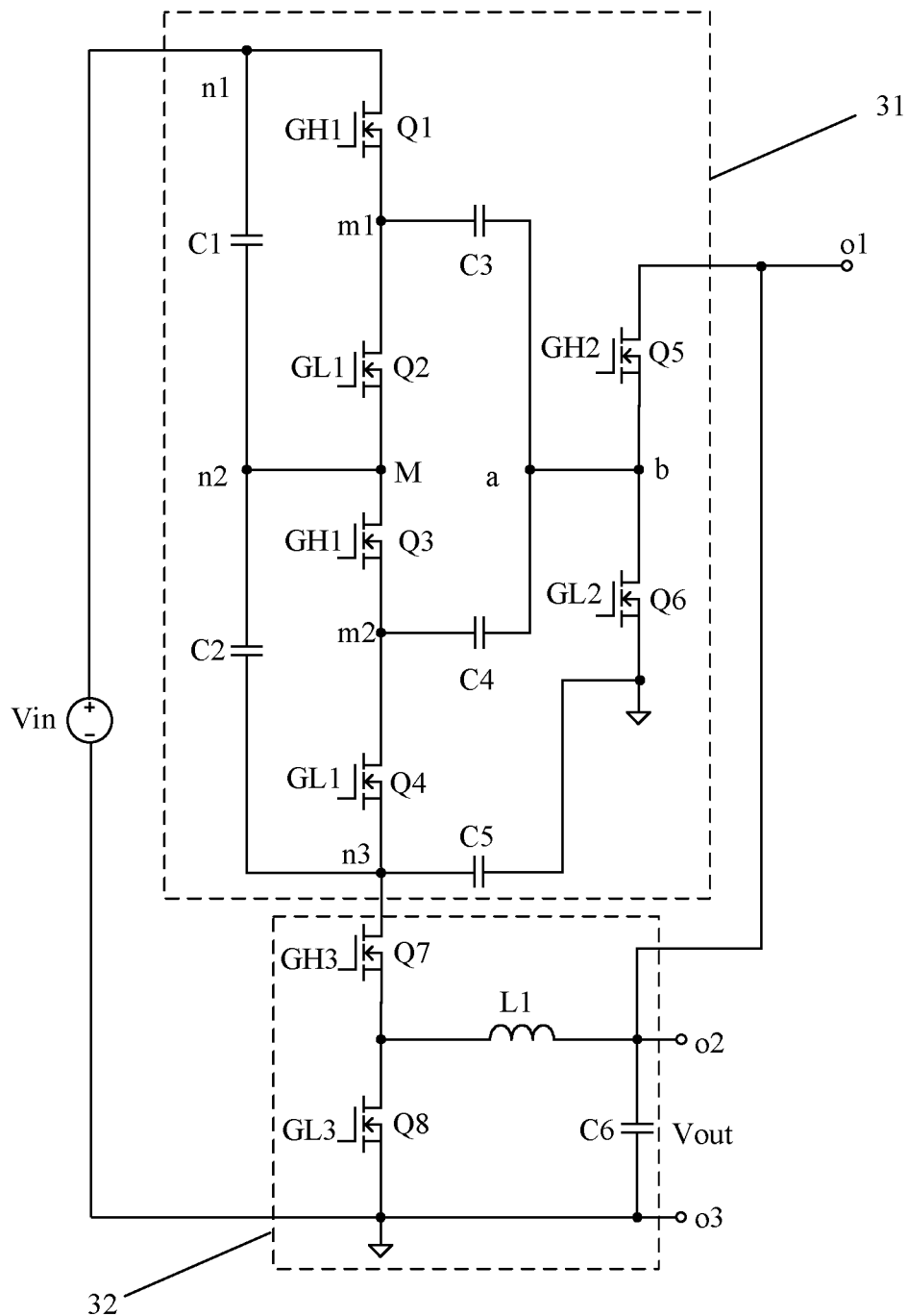
FIG. 3 is a schematic block diagram of a second example DC-DC converter, in accordance with embodiments of the present invention.

Referring now to FIG. 3, shown is a schematic block diagram of a second example DC-DC converter in accordance with embodiments of the present invention. In this example, the DC-DC converter can include isolated switched capacitor converter 31 and switching converter 32. For example, input ports of switched capacitor converter 31 and switching converter 32 can connect in series, and output ports of switched capacitor converter 31 and switching converter 32 can connect in parallel. Switched capacitor converter 31 can include two first switch groups, one second switch group, two first capacitors C3 and C4, two second capacitors C1 and C2, and isolation capacitor C5.

Further, one first switch group can include switches Q1 and Q2 coupled in series with each other to form a half-bridge circuit, and the other first switch group can include switches Q3 and Q4 coupled in series with each other to form a half-bridge circuit. The second switch group can include switches Q5 and Q6 coupled in series with each other to form a half-bridge circuit. In this example, a middle terminal of first capacitors C3 and C4 can connect to terminal "a," and terminal a can connect to middle terminal "b" of the half-bridge circuit formed by switches Q5 and Q6, such that terminal a can be selectively coupled to either terminal o1 of the output port of switched capacitor converter 31 or the ground terminal.

The other terminals m1 and m2 of first capacitors C3 and C4 can be respectively coupled to the middle terminal of the half-bridge circuit formed by switches Q1 and Q2 and the middle terminal of the half-bridge circuit formed by switches Q3 and Q4. Also, second capacitors C1 and C2 can be successively coupled in series between two terminals of the input port of switched capacitor converter 31 (e.g., between terminals n1 and n3). Further, second capacitor C1 can connect between terminals n1 and n2, and second capacitor C2 can connect between terminals n2 and n3. Terminal m1 of first capacitor C3 can be selectively coupled to terminal n1 or terminal n2 through the half-bridge circuit formed by switches Q1 and Q2, and terminal m2 of first capacitor C4 can be selectively coupled to terminal n2 or terminal n3 through the half-bridge circuit formed by switches Q3 and Q4. Isolation capacitor C5 can connect between terminal n3 and the ground terminal. Also, isolation capacitor C5 can be coupled between terminal n2 or terminal n1 and the ground terminal. In this particular example, with isolation capacitor C5, isolation between the input port and the output port of switched capacitor converter 31 can be achieved, and a current return path between the two ports can be formed.

In this particular example, switches Q1 and Q2 can be respectively controlled by control signals GH1 and GL1, and switches Q3 and Q4 can be respectively controlled by control signals GH1 and GL1. When control signals GH1 and GL1 are in opposite phase, the switching states of switches Q1 and Q2 may be complementary and the switching states of switches Q3 and Q4 may be complementary. That is, when switches Q1 and Q3 are synchronously turned on, switches Q2 and Q4 can synchronously be turned off correspondingly, and vice versa. Also, switches Q5 and Q6 can be respectively controlled by control signals GH2 and GL2. When control signals GH2 and GL2 are in opposite phase, the switching states of switches Q5 and Q6 may be complementary. Thus, control signal GH2 and control signal GH1 for controlling two first switch groups may be in phase. That is, when switches Q1, Q3 and Q5 are synchronously turned on, switches Q2, Q4, and Q6 can synchronously be turned off correspondingly, and vice versa. Therefore, the switching states of switches Q1-Q6 can be controlled to transition/switch by control signals GH1, GL1, GH2, and GL2, such that the ratio of output voltage Vout1 and input voltage Vin1 of switched capacitor converter 31 may be a fixed value that satisfies the following equation:

$$\frac{Vout1}{Vin1} = X = \frac{1}{2}$$

In this particular example, switching converter 32 can include switches Q7 and Q8, output capacitor C6, and inductor L as a magnetic component. Switches Q7 and Q8 can be successively coupled in series between one terminal n3 of the input port of switching converter 32 and the ground terminal. Inductor L can connect between a middle terminal of switches Q7 and Q8 and terminal o2 of the output port of switching converter 32. Output capacitor C6 can connect between terminal o2 and terminal o3 (i.e., the ground terminal). It should be understood that the input ports of switched capacitor converter 31 and switching converter 32 can be coupled in series between two terminals of input voltage Vin, and the output ports of switched capacitor converter 31 and switching converter 32 can be coupled in parallel between two terminals of output voltage Vout (e.g., between terminal o2 and the ground terminal).

Switches Q7 and Q8 can be controlled by control signals GH3 and GL3. When control signals GH3 and GL3 are in opposite phase, the switching states of switches Q7 and Q8 may be complementary. Thus, output voltage Vout2 of switching converter 32 can be determined by input voltage Vin2 and the duty cycle of control signal GH3. The duty cycle of control signal GH3 can be adjusted in accordance with the expected output voltage, such that switches Q7 and Q8 may be controlled to alternately be turned on and off, and the charging period and discharging period of inductor L and capacitor C6 can be controlled to perform power conversion. Therefore, the relationship between output voltage Vout2 and input voltage Vin2 of switching converter 32 can satisfy the following equation:

$$\frac{Vout2}{Vin2} = M(D)$$

Here, D is the duty cycle of control signal GH3 and M(D) is a function about duty cycle D. When control signals GH3 and GL3 are continuous, M(D)=D. That is, the ratio of the output voltage and the input voltage of switching converter 32 is equal to duty cycle D of control signal GH3 of switching converter 32.

Since the input ports of switched capacitor converter 31 and switching converter 32 are coupled in series and the output ports of switched capacitor converter 31 and switching converter 32 are coupled in parallel, input voltage Vin and output voltage Vout of the DC-DC converter can be expressed as:

$$Vin = Vin1 + Vin2 = \frac{Vout1}{X} + \frac{Vout2}{M(D)}$$

Here, Vout1=Vout2=Vout.

Thus, input voltage Vin and output voltage Vout of the DC-DC converter can be further expressed as:

$$\frac{Vout}{Vin} = \frac{1}{\frac{1}{X} + \frac{1}{M(D)}} = \frac{1}{\frac{1}{1/2} + \frac{1}{D}} = \frac{1}{2 + \frac{1}{D}} = \frac{D}{2D+1}$$

It should be understood that switches Q1-Q8 are metal-oxide-semiconductor transistors (MOSFETs) in this particular example, but other electrically controlled switching devices (e.g., bipolar junction transistors [BJTs], insulated gate bipolar transistors [IGBTs], etc.) may additionally or alternatively be utilized in certain embodiments. In this example, switching converter 32 is a converter with a buck topology. Those skilled in the art will also recognize that switching converter 32 can also be a converter with any suitable converter topology (e.g., boost, buck-boost, Zeta, Sepic, Cuk, flyback, forward, push-pull, half-bridge, full-bridge, LLC, etc.), in accordance with circuit requirements.

In this example, the input ports of the switched capacitor converter and the switching converter are coupled in series and the output ports of the switched capacitor converter and the switching converter are coupled in parallel, such that the switched capacitor converter and the switching converter both can transmit the power to the output port, thereby reducing the power transmitted by the switching converter and improving the efficiency of the system. Also, the output voltage of the DC-DC converter can be regulated by adjusting the duty cycles of the control signals of the switching converter, thereby achieving a relatively smooth adjustment for the output voltage and an adjustable gain. In addition, the isolation capacitor in this example may provide isolation between the input port and the output port of the DC-DC converter without utilizing a transformer, thereby avoiding possible effects of current pulsation on the input voltage and the output capacitor of the DC-DC converter.

Figure 4:
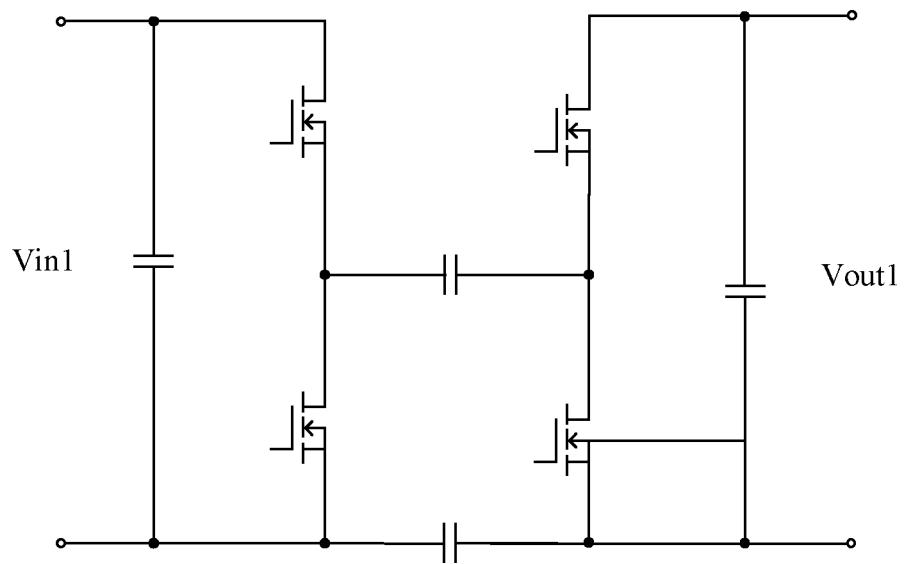
FIG. 4 is a schematic block diagram of a first example switched capacitor converter, in accordance with embodiments of the present invention.
Figure 5:
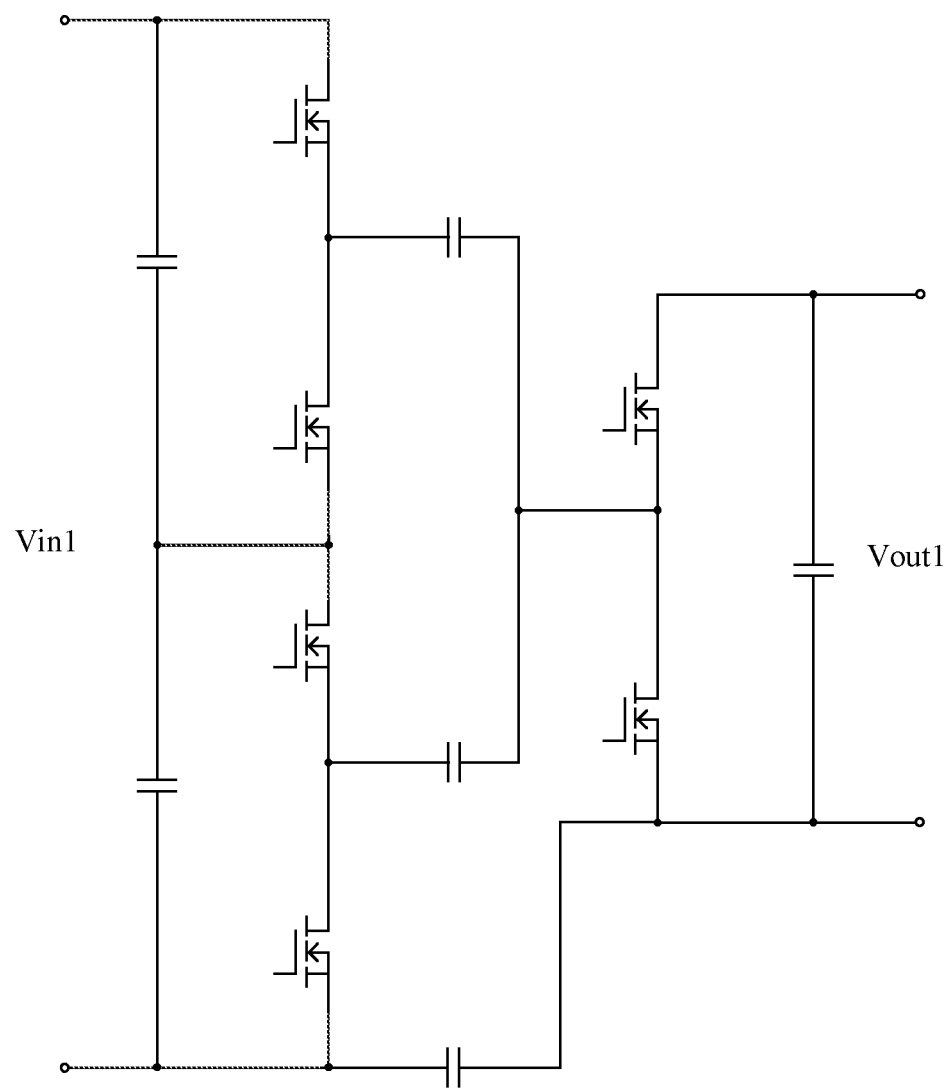
FIG. 5 is a schematic block diagram of a second example switched capacitor converter, in accordance with embodiments of the present invention.
Figure 6:
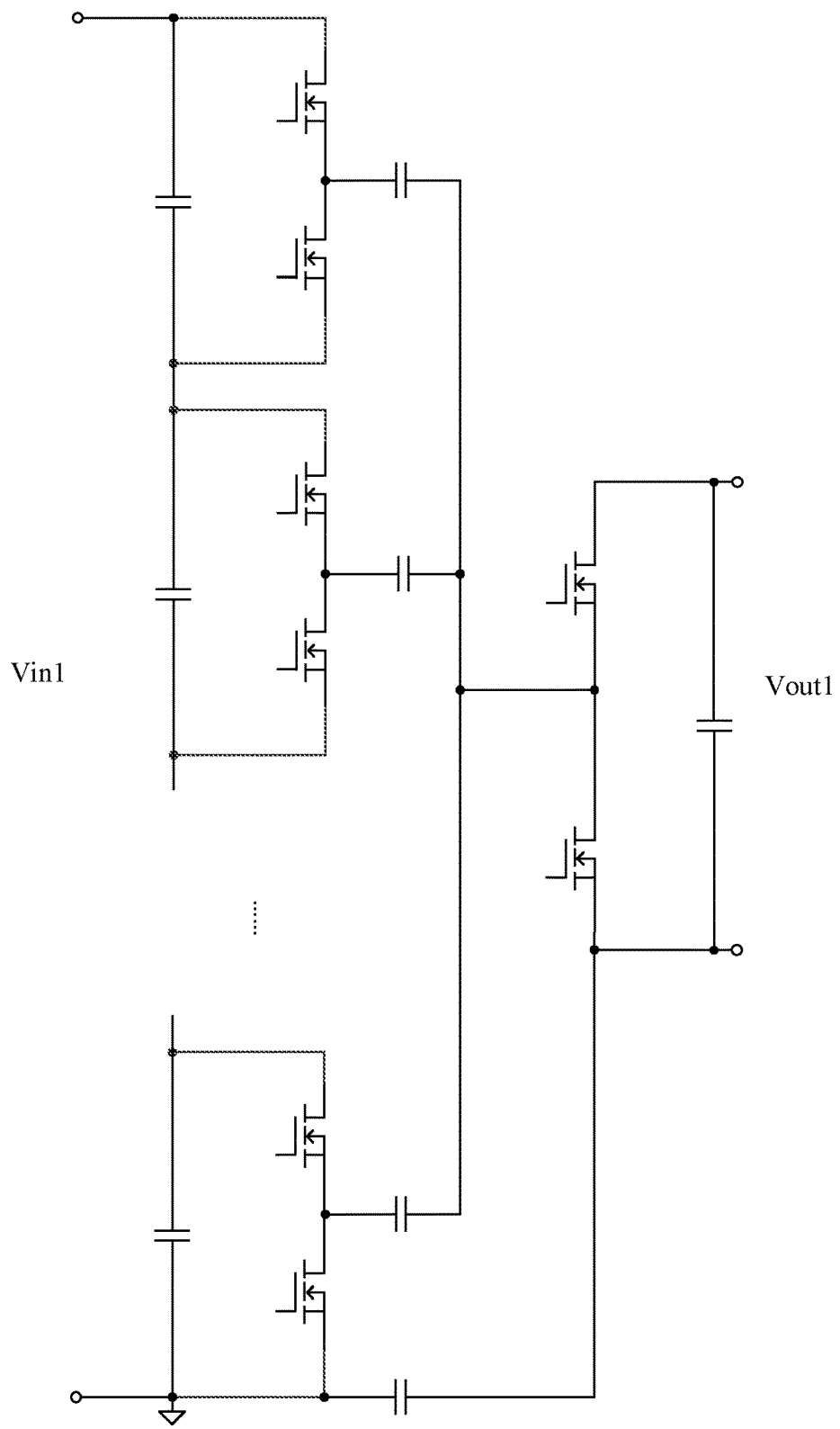
FIG. 6 is a schematic block diagram of a third example switched capacitor converter, in accordance with embodiments of the present invention.

Referring now to FIGS. 4-6, shown are schematic block diagrams of a first example switched capacitor converter, a second switched capacitor converter, and a third example switched capacitor converter, respectively, in accordance with embodiments of the present invention. The switched capacitor converter in these examples can include N first capacitors, N second capacitors, N first switch groups, a second switch group, and at least one isolation capacitor, where N is a positive integer.

In these examples, each of N first capacitors may have a first terminal coupled to each other. N second capacitors can be successively coupled in series between two terminals of the input port of switched capacitor converter 31. A second terminal of each first capacitor can be selectively coupled to a first terminal or a second terminal of a corresponding second capacitor by a corresponding first switch group. Also, the first terminal of each first capacitor that coupled to each other can be selectively coupled to the first terminal or the second terminal of the output port by the second switch group. In these examples, N is equal to 1 in FIG. 4, N is equal to 2 in FIG. 5, and N is greater than 2 in FIG. 6. Thus, the relationship between output voltage Vout1 and input voltage Vin1 of the switched capacitor converter can be expressed as:

$$\frac{Vout1}{Vin1} = X = \frac{1}{N} \ (N \geq 1)$$

When the control signals of the switching converter is continuous, the relationship between output voltage Vout and input voltage Vin of the DC-DC converter can be expressed as:

$$\frac{Vout}{Vin} = \frac{1}{\frac{1}{X} + \frac{1}{M(D)}} = \frac{1}{\frac{1}{1/N} + \frac{1}{D}} = \frac{1}{N + \frac{1}{D}} = \frac{D}{ND+1}$$

Therefore, the numbers of the first capacitors, second capacitors, and first switch groups, and the duty cycles of the control signals of the switching converter, can be changed to regulate the relationship between the input voltage and the output voltage of the DC-DC converter, in order to meet circuit requirements of the output voltage.

Figure 7:
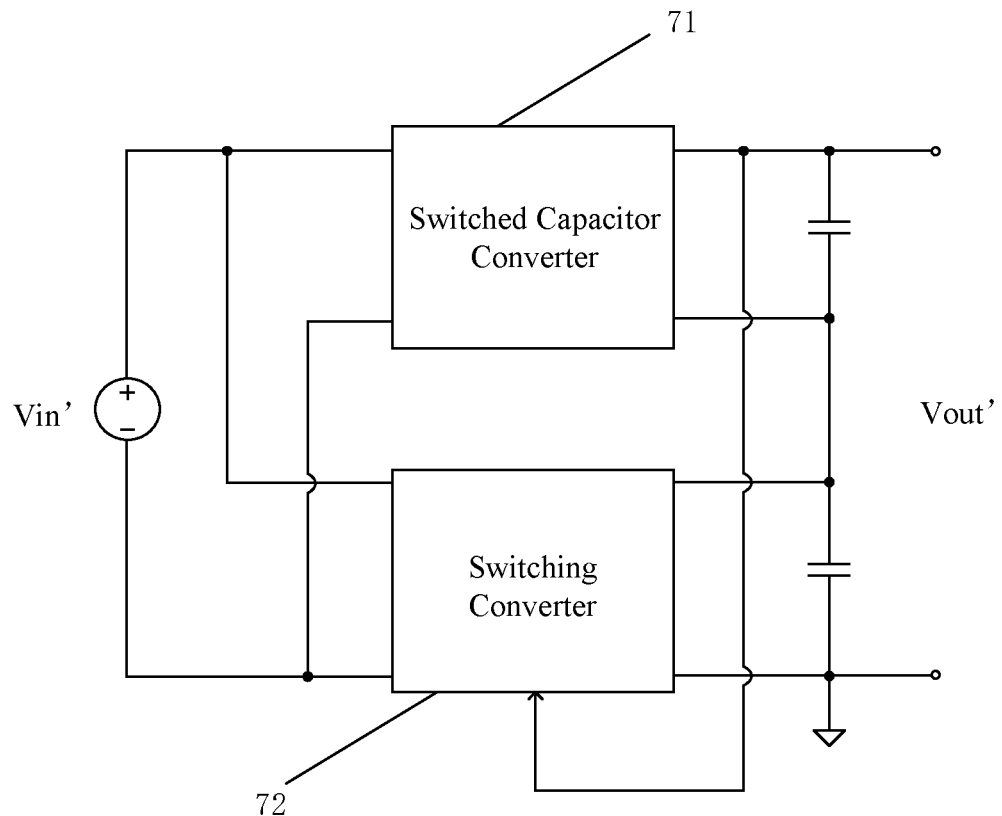
FIG. 7 is a schematic block diagram of a third example DC-DC converter, in accordance with embodiments of the present invention.

Referring now to FIG. 7, shown is a schematic block diagram of a third example DC-DC converter in accordance with embodiments of the present invention. In this example, the DC-DC converter can include switched capacitor converter 71 and switching converter 72. The input ports of switched capacitor converter 71 and switching converter 72 can connect in parallel, while the output ports of switched capacitor converter 71 and switching converter 72 can connect in series. In this particular example, switched capacitor converter 71 can be isolated or non-isolated. Also, switched capacitor converter 71 can operate in an open-loop control mode, and the relationship between input voltage Vin1' and output voltage Vout1' of switched capacitor converter 71 may be as follows:

$$\frac{Vout1'}{Vin1'} = X'$$

Here, X' is a constant value, and ratio X' of the output voltage and the input voltage of switched capacitor converter 71 can be adjusted to meet circuit requirements.

Switching converter 72 can operate in a closed-loop control mode, such that duty cycle D of the control signal of switching converter 72 may be adjusted in accordance with the expected output voltage. The relationship between input voltage Vin2' and output voltage Vout2' of switching converter 72 can be as follows:

$$\frac{Vout2'}{Vin2'} = M'(D)$$

Here, M'(D) is a function about duty cycle D.

In this particular example, since the input ports of switched capacitor converter 71 and switching converter 72 can be coupled in parallel and the output ports of switched capacitor converter 71 and switching converter 72 coupled in series, input voltage Vin' and output voltage Vout' of the DC-DC converter can be expressed as:

$$Vout' = Vout1' + Vout2' = X'^* Vin1' + M'(D)^* Vin2'$$

Here, Vin1'=Vin2'=Vin'.

Thus, the relationship between input voltage Vin' and output voltage Vout' of the DC-DC converter can be further expressed as:

$$\frac{Vout'}{Vin'} = X' + M'(D)$$

In this example, switched capacitor converter 71 and switching converter 72 can perform bidirectional power conversion, such that the DC-DC converter may achieve bidirectional regulation. It should be understood that switching converter 72 can be a converter with any suitable topology (e.g., boost, buck, buck-boost, Zeta, Sepic, Cuk, flyback, forward, push-pull, half-bridge, full-bridge, LLC, etc.). In this example, the input ports of the switched capacitor converter and the switching converter are coupled in parallel and the output ports of the switched capacitor converter and the switching converter are coupled in series, such that the switched capacitor converter and the switching converter both can transmit the power to the output port, thereby reducing the power transmitted by the switching converter and improving the system efficiency. Also, the output voltage of the DC-DC converter can be regulated by adjusting the duty cycles of the control signals of the switching converter, thereby achieving a smooth adjustment for the output voltage and an adjustable gain.

Figure 8:
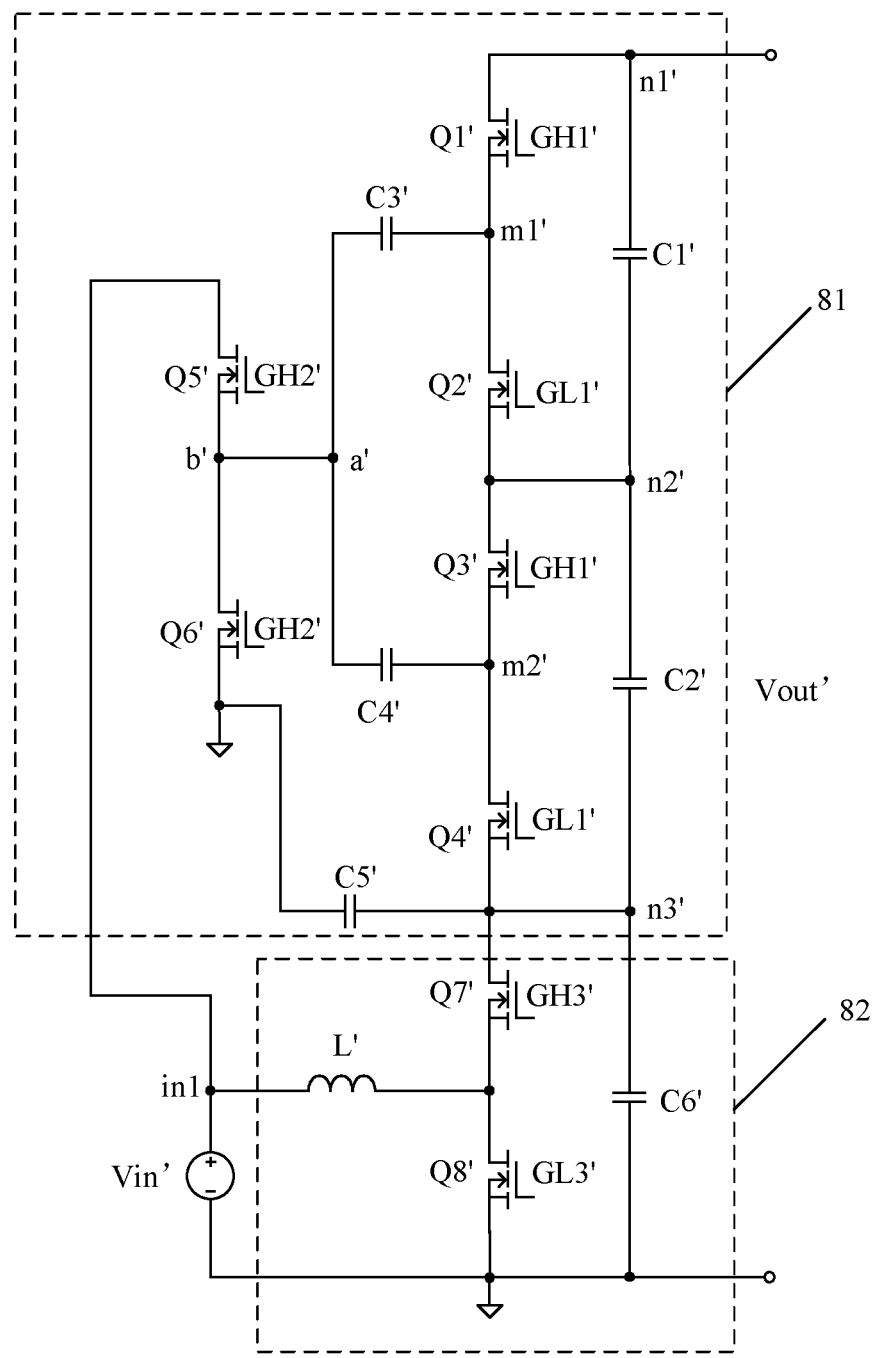
FIG. 8 is a schematic block diagram of a fourth example DC-DC converter, in accordance with embodiments of the present invention.

Referring now to FIG. 8, shown is a schematic block diagram of a fourth example DC-DC converter in accordance with embodiments of the present invention. The DC-DC converter can include isolated switched capacitor converter 81 and switching converter 82. In this particular example, the input ports of switched capacitor converter 81 and switching converter 82 are coupled in parallel and the output ports of switched capacitor converter 81 and switching converter 82 are coupled in series. Switched capacitor converter 81 can include two first switch groups, one second switch group, two first capacitors C3' and C4', two second capacitors C1' and C2', and isolation capacitor C5. One first switch group can include switches Q1' and Q2' coupled in series with each other to form a half-bridge circuit.

The other first switch group can include switches Q3' and Q4' coupled in series with each other to form a half-bridge circuit. The second switch group can include switches Q5' and Q6' coupled in series with each other to form a half-bridge circuit. In this example, a middle terminal of first capacitors C3' and C4' can be coupled to terminal a', and terminal a' can be coupled to middle terminal b' of the half-bridge circuit formed by switches Q5' and Q6', such that terminal a' can be selectively coupled to terminal in1 or the ground terminal of the input port of switched capacitor converter 81. Terminals m1' and m2' of first capacitors C3' and C4' can be respectively coupled to a middle terminal of the half-bridge circuit formed by switches Q1' and Q2' and a middle terminal of the half-bridge circuit formed by switches Q3' and Q4'. Second capacitors C1' and C2' can be successively coupled between two terminals of the output port of switched capacitor converter 81 (e.g., between terminals n1' and n3'). Further, second capacitor C1' can be coupled between terminals n1' and n2', and second capacitor C2' may be coupled between terminals n2' and n3'.

Also, terminal m1' of first capacitor C3' can be selectively coupled to terminal n1' or terminal n2' through the half-bridge circuit formed by switches Q1' and Q2', and terminal m2' of first capacitor C4' can be selectively coupled to terminal n2' or terminal n3' through the half-bridge circuit formed by switches Q3' and Q4'. Isolation capacitor C5' can connect between terminal n3' and the ground terminal. In this example, isolation capacitor C5' can also be coupled between terminal n2' or terminal n1' and the ground terminal. With isolation capacitor C5', isolation between the input port and the output port of switched capacitor converter 31 can be achieved, and a current return path between the two ports may be formed.

In this particular example, switches Q1' and Q2' can be respectively controlled by control signals GH1' and GL1', and switches Q3' and Q4' can be respectively controlled by control signals GH1' and GL1'. When control signals GH1' and GL1' are in opposite phase, the switching states of switches Q1' and Q2' may be complementary, and the switching states of switches Q3' and Q4' may be complementary. That is, when switches Q1' and Q3' are synchronously turned on, switches Q2' and Q4' can synchronously be turned off correspondingly, and vice versa. Also, switches Q5' and Q6' can respectively be controlled by control signals GH2' and GL2'. When control signals GH2' and GL2' are in opposite phase, the switching states of switches Q5' and Q6' may be complementary. In addition, control signals GH2' and GH1' can be in phase. That is, when switches Q1', Q3' and Q5' are synchronously turned on, switches Q2', Q4' and Q6' may synchronously be turned off correspondingly, and vice versa. Therefore, switches Q1'-Q6' can be controlled by control signals GH1', GL1', GH2', and GL2' in order to switch/transition states, such that the ratio of output voltage Vout1' and input voltage Vin1' of switched capacitor converter 81 can be a fixed value that satisfies the following equation:

$$\frac{Vout1'}{Vin1'} = X' = 2$$

In this particular example, switching converter 82 can include switches Q7' and Q8', output capacitor C6', and inductor L' as a magnetic component. Switches Q7' and Q8' can be successively coupled in series between terminal n3' of the output port of switching converter 32 and the ground terminal. Inductor L' can connect between a middle terminal of switches Q7' and Q8' and terminal in1 of the input port of switching converter 82. Output capacitor C6' can connect between terminal n3' and the ground terminal. It should be understood that the input ports of switched capacitor converter 81 and switching converter 82 can be coupled in parallel between two terminals of input voltage Vin', and the output ports of switched capacitor converter 81 and switching converter 82 can be coupled in series between two terminals of output voltage Vout' (e.g., between terminal n1' and the ground terminal).

Switches Q7' and Q8' can be controlled by control signals GH3' and GL3'. When control signals GH3' and GL3' are in opposite phase, the switching states of switches Q7' and Q8' may be complementary. Thus, output voltage Vout2' of switching converter 82 can be determined by input voltage Vin2' and the duty cycle of control signal GH3'. The duty cycle of the control signal can be adjusted in accordance with an expected output voltage, such that switches Q7' and Q8' may be controlled to alternately be turned on and off, and the charging period and discharging period of inductor L' and capacitor C6' can be controlled to perform power conversion. Therefore, the relationship between output voltage Vout2' and input voltage Vin2' of switching converter 82 may satisfy the following equation:

$$\frac{Vout2'}{Vin2'} = M'(D)$$

Here, D is the duty cycle of control signal GH3' and M(D) is a function about duty cycle D. When control signals GH3' and GL3' are continuous, M(D)=1/D. That is, the ratio of the output voltage and the input voltage of switching converter 82 is the reciprocal of the duty cycle of control signal GH3' of switching converter 82.

Since the input ports of switched capacitor converter 81 and switching converter 82 are coupled in parallel and the output ports of switched capacitor converter 81 and switching converter 82 are coupled in series, input voltage Vin' and output voltage Vout' of the DC-DC converter can be expressed as:

Vout'=Vout1'+Vout2'=X'*Vin1'+M'(D)*Vin2'

Here, Vin1'=Vin2'=Vin'.

Thus, input voltage Vin' and output voltage Vout' of the DC-DC converter can be further expressed as:

$$\frac{Vout'}{Vin'} = X' + M'(D) = 2 + \frac{1}{D} = \frac{2D+1}{D}$$

It should be understood that switches Q1'-Q8' are metal-oxide-semiconductor transistors (MOSFETs) in this example, other electrically controlled switching devices (e.g., bipolar junction transistors [BJTs] and insulated gate bipolar transistors [IGBTs], etc.) can additionally or alternatively be utilized as switches in certain embodiments. In this example, switching converter 82 is a converter with a buck topology. Those skilled in the art will recognize that switching converter 82 can be a converter with any suitable converter topology (e.g., boost, buck-boost, Zeta, Sepic, Cuk, flyback, forward, push-pull, half-bridge, full-bridge, LLC, etc.), in accordance with circuit requirements.

In particular embodiments, the input ports of the switched capacitor converter and the switching converter are coupled in parallel and the output ports of the switched capacitor converter and the switching converter are coupled in series, such that the switched capacitor converter and the switching converter can both transmit the power to the output port of the DC-DC converter, thereby reducing the power transmitted by the switching converter and improving the efficiency of the system. Also, the output voltage of the DC-DC converter can be regulated by adjusting the duty cycles of the control signals of the switching converter, thereby achieving a relatively smooth adjustment for the output voltage and an adjustable gain. In addition, the isolation capacitor may be employed to provide isolation between the input port and the output port of the DC-DC converter without utilizing a transformer, thereby avoiding possible effects of the current pulsation on the input voltage and the output capacitor of the DC-DC converter.

For example, switched capacitor converter 81 can include N first capacitors, N second capacitors, N first switch groups, one second switch group and at least one isolation capacitor, where N is a positive integer. Further, each of N first capacitors may have a first terminal coupled to each other. N second capacitors can be successively coupled in series between two terminals of the output port of switched capacitor converter 81. A second terminal of each first capacitor can be selectively coupled to a first terminal or a second terminal of a corresponding second capacitor by a corresponding first switch group. Also, the first terminal of each first capacitor coupled to each other can be selectively coupled to the first terminal or the second terminal of the input port by the second switch group. Thus, the ratio of output voltage Vout1' and input voltage Vin1' of the switched capacitor converter can be expressed as:

$$\frac{Vout1'}{Vin1'} = X' = N \ (N \geq 1)$$

When the control signals of the switching converter can be continuous, the relationship between output voltage Vout and input voltage Vin of the DC-DC converter can be expressed as:

$$\frac{Vout'}{Vin'} = X' + M'(D) = N + \frac{1}{D} = \frac{ND+1}{D}$$

Therefore, the numbers of first capacitors, second capacitors, first switch groups, and the duty cycles of control signals of the switching converter, can be changed to regulate the relationship between the input voltage and the output voltage of the DC-DC converter, in order to meet output voltage circuit requirements.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A DC-DC converter, comprising:
   a) a switched capacitor converter having an input port for receiving an input voltage, and an output port for generating an output voltage;
   b) a switching converter having an input port for receiving an input voltage, and an output port for generating an output voltage; and
   c) wherein said input ports of said switched capacitor converter and said switching converter are coupled to each other in series, and said output ports of said switched capacitor converter and said switching converter are coupled to each other in and parallel, in order to generate the same output voltage.

2. The DC-DC converter of claim 1, wherein said switched capacitor converter is an isolated switched capacitor converter.

3. The DC-DC converter of claim 1, wherein said switched capacitor converter is a non-isolated switched capacitor converter.

4. The DC-DC converter of claim 1, wherein said switched capacitor converter and said switching converter are configured to perform bidirectional power conversion, such that said DC-DC converter achieves bidirectional regulation.

5. The DC-DC converter of claim 1, wherein said switched capacitor converter is a converter having a topology selected from the group of: boost, buck, buck-boost, Zeta, Sepic, Cuk, flyback, forward, push-pull, half-bridge, full-bridge, and LLC.

6. The DC-DC converter of claim 1, wherein said switched capacitor converter comprises:
   a) N first capacitors, each first capacitor having a first terminal coupled to each other, wherein N is a positive integer;
   b) N second capacitors, successively coupled in series between two terminals of said input port of said switched capacitor converter, or successively coupled in series between two terminals of said output port of said switched capacitor converter;
   c) N first switch groups, wherein a second terminal of each first capacitor is selectively coupled to a first or a second terminal of a corresponding second capacitor by a corresponding first switch group; and
   d) a second switch group, wherein said first terminal of each first capacitor being coupled to each other is selectively coupled to a first or a second terminal of said output port or said input port of said switched capacitor converter by said second switch group,
   e) wherein said first switch group and said second switch group are controlled to perform switching state, such that an output voltage of said switched capacitor converter is proportional to an input voltage of said switched capacitor converter.

7. The DC-DC converter of claim 6, wherein said switched capacitor converter further comprises at least one isolation capacitor coupled between any one of terminals of said output port or said input port of said switched capacitor converter and any one of terminals of said N second capacitors.

8. The DC-DC converter of claim 6, wherein each first switch group and said second group are half-bridge circuits comprising a first switch and a second switch, wherein switching states of said first switch and said second switch are complementary.

9. The DC-DC converter of claim 1, wherein said switching converter comprises an output capacitor coupled between two terminals of said output port of said switching converter.

10. The DC-DC converter of claim 1, wherein a relationship between input and output voltages of said DC-DC converter is as follows:

$$\frac{Vout}{Vin} = \frac{1}{\frac{1}{X} + \frac{1}{M(D)}}$$

wherein Vin and Vout are respectively said input voltage and said output voltage of said DC-DC converter, X is a ratio of said output voltage and said input voltage of said switched capacitor converter, and M(D) is a function about a duty cycle of a control signal of said switching converter for characterizing a relationship between said output and input voltages of said switching converter.

11. A DC-DC converter, comprising:
   a) a switched capacitor converter having an input port for receiving an input voltage, and an output port for generating an output voltage;
   b) a switching converter having an input port for receiving an input voltage, and an output port for generating an output voltage; and
   c) wherein said input ports of said switched capacitor converter and said switching converter are coupled to each other in parallel to receive the same input voltage, and said output ports of said switched capacitor converter and said switching converter are coupled to each other in series.

12. The DC-DC converter of claim 11, wherein said switched capacitor converter is an isolated switched capacitor converter.

13. The DC-DC converter of claim 11, wherein said switched capacitor converter is a non-isolated switched capacitor converter.

14. The DC-DC converter of claim 11, wherein said switched capacitor converter and said switching converter are configured to perform bidirectional power conversion, such that said DC-DC converter achieves bidirectional regulation.

15. The DC-DC converter of claim 11, wherein said switched capacitor converter is a converter having a topology selected from the group of: boost, buck, buck-boost, Zeta, Sepic, Cuk, flyback, forward, push-pull, half-bridge, full-bridge, and LLC.

16. The DC-DC converter of claim 11, wherein said switched capacitor converter comprises:
   a) N first capacitors, each first capacitor having a first terminal coupled to each other, wherein N is a positive integer;
   b) N second capacitors, successively coupled in series between two terminals of said input port of said switched capacitor converter, or successively coupled in series between two terminals of said output port of said switched capacitor converter;

c) N first switch groups, wherein a second terminal of each first capacitor is selectively coupled to a first or a second terminal of a corresponding second capacitor by a corresponding first switch group; and
d) a second switch group, wherein said first terminal of each first capacitor being coupled to each other is selectively coupled to a first or a second terminal of said output port or said input port of said switched capacitor converter by said second switch group,
e) wherein said first switch group and said second switch group are controlled to perform switching state, such that an output voltage of said switched capacitor converter is proportional to an input voltage of said switched capacitor converter.

17. The DC-DC converter of claim 16, wherein said switched capacitor converter further comprises at least one isolation capacitor coupled between any one of terminals of said output port or said input port of said switched capacitor converter and any one of terminals of said N second capacitors.

18. The DC-DC converter of claim 16, wherein each first switch group and said second group are half-bridge circuits comprising a first switch and a second switch, wherein switching states of said first switch and said second switch are complementary.

19. The DC-DC converter of claim 11, wherein said switching converter comprises an output capacitor coupled between two terminals of said output port of said switching converter.

20. The DC-DC converter of claim 11, wherein a relationship between input and output voltages of said DC-DC converter is as follows:

$$\frac{Vout}{Vin} = X + M(D)$$

wherein Vin and Vout are respectively said input voltage and said output voltage of said DC-DC converter, X is a ratio of said output voltage and said input voltage of said switched capacitor converter, and M(D) is a function about a duty cycle of a control signal of said switching converter for characterizing a relationship between said output and input voltages of said switching converter.

* * * * *